INVENTOR.
Arthur F. Dewsberry
BY
Barnard, McGlynn & Reising
ATTORNEYS

3,307,336
AIR FILTER INSTALLATION
Arthur F. Dewsberry, Dearborn, Mich., assignor to Massey-Ferguson Inc., Detroit, Mich., a corporation of Maryland
Filed June 7, 1963, Ser. No. 286,363
4 Claims. (Cl. 55—337)

This invention relates to an air filter installation for the internal combustion engine of a vehicle and, in particular, to such a filter assembly installation for agricultural or industrial tractors and the like wherein the filter assembly is accessible laterally of the body of the vehicle with which it is associated to facilitate installations and changing of the filter cartridge components thereof.

Agricultural and industrial tractors and similar vehicles to which the present invention particularly pertains typically include an air filter assembly, including a housing and a removable filter cartridge disposed therein, mounted in an upright relatively high level position on the vehicle body beneath the hood or cowling construction thereof whereby, upon swinging the usual hood panel upwardly, access may be had through the hood to the upper end of the housing for removing a dirty cartridge and inserting a clean cartridge therethrough. As a consequence, in order to afford sufficient room beneath the hood or cowling construction to accommodate such an upright filter assembly, the over-all profile of the tractor or other vehicle may be increased to an objectionable extent under certain operating conditons, such as operating in orchard areas having low overhung branches, and additionally due to styling considerations. Furthermore, it is to be noted that agricultural and industrial tractors and the like operate in areas and under conditions in which the ambient air is laden with a considerable concentration of dust, chaff and other debris which the filter assembly is called upon to filter for the purpose of supplying a filtered charge of air to the internal combustion engine with which it is associated. As a result, in such tractors, the filter cartridge requires changing at relatively short intervals. Due to the mountings employed for such filter assemblies heretofore, and particularly due to their upright installations at a relatively high level on the vehicle with which they are associated, such an assembly is relatively inaccessible for the purpose of servicing it. More specifically, and referring to an agricultural tractor, replacement of a ditry filter normally requires the tractor operator to climb one side of the tractor using a wheel thereof for support, for example, in order to obtain access to the filter assembly for such service purpose.

In view of the foregoing considerations, the present invention relates to an air filter assembly adapted to be mounted on its side beneath the hood construction of a vehicle including the usual spaced side panel members interconnected by a hood panel member, and is particularly characterized by the fact that the filter assembly includes a filter cartridge housing having an open end disposed opposite to an opening within one of the aforementioned side panel members whereby a filter cartridge of the assembly may be removably inserted through the openings in such side panel and housing into the latter at a low level, relatively speaking, wherein filter cartridges may be readily installed and replaced without requiring the vehicle operator to climb all over the vehicle while minimizing the space required beneath the vehicle hood to accommodate the filter assembly and, hence, reducing the overall profile of the vehicle.

In this regard, the invention is particularly characterized by a retaining means associated with the open end of the filter housing for removably retaining a filter cartridge therein, such retaining means being readily accessible through the opening in the one side panel member aforementioned for removal of a dirty filter and replacement thereof through such opening in such side panel.

More specifically, the invention is further characterized by a door means pivotally mounted on the one side panel member aforementioned for the purpose of opening and closing the opening therein for access to the filter assembly.

In order to facilitate an understanding of the invention, a preferred embodiment thereof will now be described with reference to the accompanying drawing in which.

Figure 1:
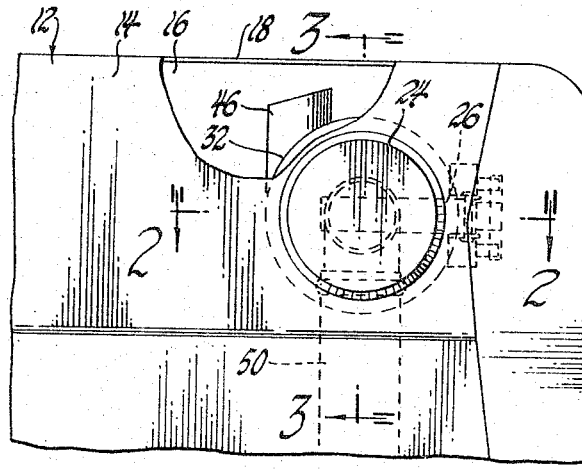
FIGURE 1 is a fragmentary side elevational view, with parts broken away and in phantom to illustrate certain details, of the upper front side of the radiator cowling and hood construction of an agricultural vehicle equipped with a preferred embodiment of the invention.

Referring now to the drawings, FIGURE 1 illustrates the upper front end of the body of an agricultural vehicle comprising the usual radiator cowling and hood cap construction 10 disposed forwardly of the usual radiator fan and engine block not shown, and the hood construction indicated generally at 12 and comprising the laterally spaced longitudinally extending side panel members 14 and 16 interconnected by the overlying longitudinally extending hood panel member 18, which hood construction extends in a conventional manner rearwardly from the radiator cowling and hood cap construction toward the vehicle operator's position. While not shown, the hood panel member 18 normally will include a hinged portion for access under the hood panel to the engine and various components thereof, which hinged portion is not shown since it is conventional and forms no part of the present invention.

Figure 2:
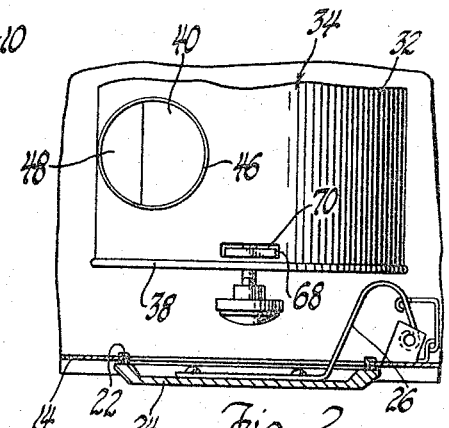
FIGURE 2 is an enlarged fragmentary sectional view taken along line 2—2 of FIGURE 1.
Figure 3:
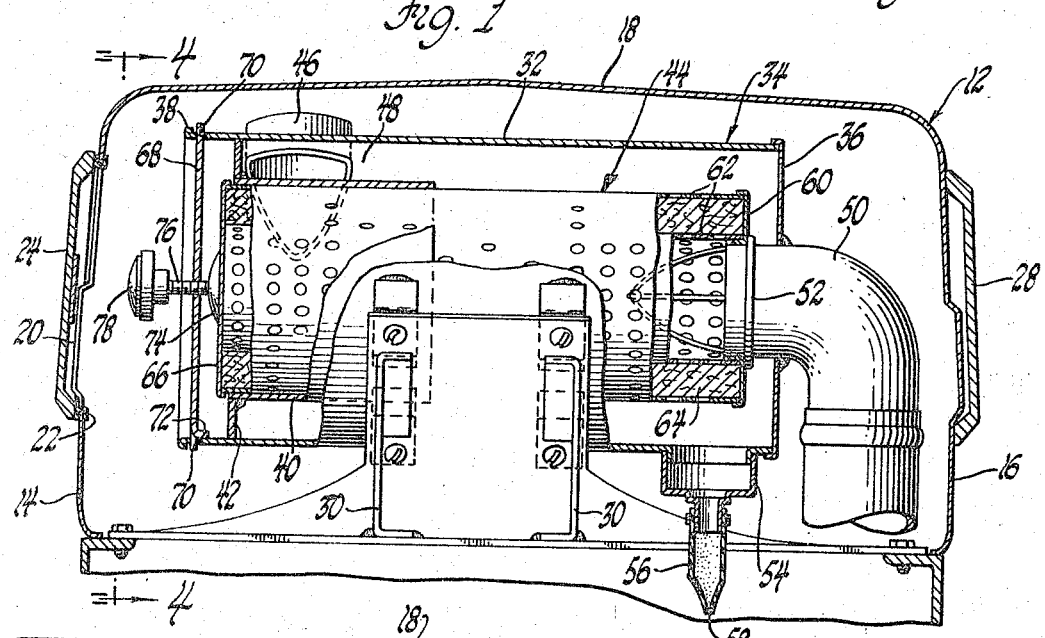
FIGURE 3 is an enlarged fragmentary sectional view, with parts broken away to illustrate certain details, taken on line 3—3 of FIGURE 1.

The side panel member 14 includes a circular opening 20 the edge of which mounts a seal means 22 for cooperation with the peripheral edge of a circular door member 24 pivotally mounted as by the conventional spring-biased hinge means 26 to an inner wall of the side panel member 14 for movement between a position engaging the seal means 22 to close the opening 20 as illustrated in FIGURES 2 and 3, and a position away therefrom for access into the hood construction through said opening. The other side panel member 16 preferably includes a simulated door member 28 fixedly secured thereto primarily for aesthetic purposes, the other visible surfaces of the door member 24 and simulated door member 28 being adapted to receive a medallion or other identifying markings associated with the vehicle concerned.

A mounting bracket structure 30 is suitably secured to the body of the vehicle beneath hood panel member 18 and between the respective side panel members 14 and 16, and is suitably rigidly secured to the side wall 32 of a cylindrical axially extending filter cartridge housing indicated generally at 34 and further including a base panel member 36 at one end thereof and a rim 38 defining a circular opening in the axially opposite other end thereof. As illustrated in the drawings, the housing 34 is secured to the mounting bracket structure 30 so as to extend laterally between the respective side panel members 14 and 16 beneath hood panel with the base panel member 36 spaced from and opposite to the side panel member 16 with the opening in the other end thereof defined by rim 38 spaced opposite from and axially aligned with opening 20 in the other side panel member 14. A cylindrical sleeve 40 having a somewhat smaller diameter than that of the housing side wall 32 is suitably supported from the internal surface of the latter as by the annular radial wall member 42 spaced axially inwardly of the housing side wall 32 a short distance from the open end of the latter. The sleeve 40 extends axially a short distance from the wall member 42 and within the housing 34 toward the base panel member 36 thereof, and is axially aligned with opening 20 so as to receive and support a portion of a filter cartridge indicated generally at 44 and as to be described hereinafter.

An air inlet stack 46 communicates with the annular chamber 48 formed between the side wall 32 and the sleeve 40 of the housing 32 and extends generally tangentially thereof toward the hood panel 18 so as to receive air to be filtered which, for example, may pass through the radiator cowling and hood cap construction 10, beneath the hood panel 18 and will then be caused to swirl circumferentially about the chamber 48 and axially along the housing 32 toward the base panel member 36 thereof. An outlet stack 50 is suitably secured centrally of the base panel member 36 and projects axially inwardly of the housing 32 toward the open end thereof, and includes an annular shoulder 52 adjacent one end thereof for the purpose of seating one end of a filter cartridge 44 as will be described hereinafter, the other end of the outlet stack being suitably connected to the vehicle engine in a conventional manner to deliver filtered air thereto. In addition, a radially outwardly presented pocket or cavity 54 is provided in the side wall 32 of the housing 34 remote from the inlet stack 46 and adjacent to the base panel member 36, whereby relatively large particles of air laden debris entering the housing 34 through the inlet stack 46 may swirl axially of the housing toward the pocket or cavity and be collected therein for discharge through a conventional flexible bladder member 56 communicating therewith and having a slit discharge opening 58.

The cartridge 44 may be of any suitable conventional construction and comprises an annular base wall 60 adapted to removably seat on the aforementioned shoulder 52, the axially extending radially spaced cylindrical walls 62 each suitably perforated as illustrated and enclosing a suitable filter material 64, and an end wall 66 closing the end of the cartridge axially opposite the base wall 60.

Figure 4:
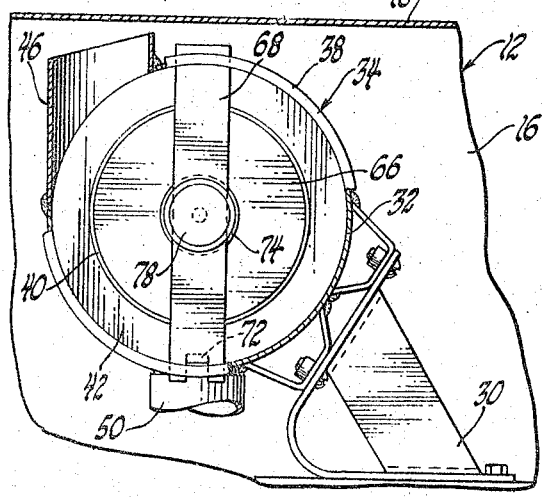
FIGURE 4 is a fragmentary sectional view taken on line 4—4 of FIGURE 3.

Retaining means are provided in order to releasably retain a given cartridge 44 within the housing 34 and comprises a retaining bar 68 adapted to extend diametrically across the open end of the housing with its opposite ends removably seated within radially opposed slots 70 in the side wall 32 of the housing immediately axially adjacent the rim 38 thereof, one end of the bar including an axially turned stop finger 72 engageable with the housing side wall to facilitate locating the bar in position between the slots 70. Thus, the bar may be shifted upwardly in FIGURES 3 and 4 of the drawings to release the lower end thereof from its associated slot, and then the entire bar removed from the open end of the housing. A retaining cup 74 is carried by one end of the manually adjustable member 76, including the knob 78 at the other end thereof presented toward hinged door member 24, threadably engaged centrally of the bar 68, whereby the member 76 may be threaded to the right in FIGURE 3 to engage the cup 74 with the end wall 66 of the filter cartridge to hold the base wall 60 thereof firmly in engagement with the shoulder 52 on the outlet stack. In addition, the reaction between the bar 68 and the slots 70 upon tightening the member 76 against the cartridge end wall 66 firmly holds the bar within such slots.

In operation, it may be assumed that the retaining means including the bar 68 and member 76 have been removed from the housing 34 and it is desired to install a cartridge 44 therein. At this time, the door member 24 is swung to its open position and the cartridge 44 is inserted into the sleeve 40 with the annular base wall 60 thereof leading. The cartridge is then inserted fully into the housing as illustrated in FIGURE 3 until the annular base wall thereof seats against the shoulder 52 on the outlet stack 50, at which time the respective ends of the retaining bar 68 are manipulated into their cooperating slots 70 and the member 76 tightened down against the end wall 66 of the cartridge to firmly hold the latter in position as aforedescribed. Thereafter, the door member 24 is closed and the assembly is complete.

When it is desired to change a dirty cartridge or otherwise service the latter, it is only necessary to again swing the door member 24 to an open position at which time the manually adjustable member 76 is easily accessible through the opening 20 in the side panel member 14 to relieve the pressure applied by the cup 74 against the end wall 66 of the cartridge. Once this pressure is relieved, the retaining bar 68 is easily manipulated out of its cooperating slots 70, and the entire retention assembly is removed through the opening 20. Thereafter, merely by reaching through the opening 20 and the open end of the housing 34, the protruding end of the cartridge 44 may be grasped and removed. Thereafter, a new cartridge may be installed within the assembly in the manner previously described.

As will be apparent, the present invention results in an air filter installation in which the filter assembly extends laterally between the side panel members of the vehicle wholly enclosed by the latter and the overlying hood panel member of the conventional hood construction. Thus, the assembly is contained wholly within the confines of the vehicle body and, due to its horizontal laterally extending disposition, does not inordinately increase the overall profile of the tractor. At the same time, at least in the majority of tractor installations, the air filter cartridge is accessible laterally from the side of the vehicle body by an operator standing on the ground.

The embodiments of the invention in which an exclusive property or privilege is claimed are defined as follows:

1. In combination, a tractor vehicle comprising a longitudinally extending body means having a longitudinal axis including a pair of longitudinally extending side panel members laterally spaced from each other and interconnected by a longitudinally extending hood panel member, a filter cartridge housing having a longitudinal axis extending between first and second ends thereof longitudinally spaced from each other, said filter cartridge housing longitudinal axis crossing said body means longitudinal axis, means mounting said filter cartridge housing within said body means beneath said hood panel member with the longitudinal axis of said filter cartridge housing extending substantially horizontally laterally between said side panel members, said filter cartridge housing extending a major portion of the distance between said side panel members with said first and second ends of said filter cartridge housing being disposed opposite and spaced apart from said respective side panel members, a filter cartridge disposed within said housing, said first end of said filter cartridge housing including an opening therein opposite one of said side panel members to removably receive said filter cartridge therein, said one of said side panel members having an opening therein opposite said opening in said filter cartridge housing for removably inserting said filter cartridge therethrough and through said opening in said filter cartridge housing and into the latter, retaining means associated with said first end of said filter cartridge housing removably retaining said inserted filter cartridge therewithin, and door means mounted on said body means for movement between positions respectively opening and closing said opening in said one of said side panel members.

2. The combination set forth in claim 1 wherein said retaining means comprises a retention member adapted to be removably engaged with said first end of said housing so as to extend across said opening therein, and manually adjustable means carried by said retention member and selectively engageable and disengageable with a first end of said cartridge to hold said cartridge in said housing.

3. The combination set forth in claim 2 wherein said housing includes a rim defining said opening in said first end thereof and a pair of opposed apertures in said first end of said housing adjacent said rim, said retention member having opposite ends removably seated within said aperatures so as to extend across said opening in said first end of said housing.

4. The combination set forth in claim 3 wherein said housing comprises a cylindrical outer wall with a base member disposed across said second end thereof, a cylindrical sleeve having a smaller diameter than said housing, means mounting said sleeve concentrically within said housing adjacent said first end thereof to define a chamber between said sleeve and said outer cylindrical wall, an outlet extending through said base member to project axially into said second end of said housing, an annular shoulder disposed about said outlet adjacent the end thereof and disposed within said housing, an inlet extending through said housing to communicate with said chamber and extending substantially tangentially of said sleeve, said filter cartridge including radially spaced concentric cylindrical walls with an annular base wall inerconnecting said cylindrical walls at the second end thereof, said annular base wall being seated against said shoulder of said outlet which extends a short distance into the inner cylindrical wall of said cartridge, and an end wall disposed at the first end of said cartridge, said cylindrical walls of said cartridge being perforated with filter material disposed therebetween, a radially outwardly extending member attached to said outer cylindrical wall of said housing adjacent said base member thereof for forming a cavity, and a flexible bladder communicating with said outwardly extending member at one end thereof and having a slit in the other end thereof for collecting and discharging debris from within said housing.

References Cited by the Examiner

UNITED STATES PATENTS

| | | |
|---|---|---|
| 419,316 | 1/1890 | Case _____ 55—455 X |
| 609,569 | 8/1898 | Berchtold _____ 292—260 X |
| 837,705 | 12/1906 | Morse _____ 55—428 X |
| 1,281,147 | 10/1918 | Dehn _____ 210—451 |
| 1,444,384 | 2/1923 | Patitz _____ 55—417 X |
| 1,581,365 | 4/1926 | Thavenet. |
| 1,591,677 | 7/1926 | Garner _____ 55—459 X |
| 1,855,038 | 4/1932 | Walker. |
| 1,873,252 | 8/1932 | Altgelt. |
| 1,957,919 | 5/1934 | Tice. |
| 2,033,731 | 3/1936 | Nallinger. |
| 2,115,472 | 4/1938 | Sargent _____ 55—267 X |
| 2,213,017 | 8/1940 | Perkins _____ 55—320 X |
| 2,221,891 | 11/1940 | Young _____ 55—267 X |
| 2,284,447 | 5/1942 | Redner _____ 210—238 X |
| 2,354,481 | 7/1944 | Russell _____ 210—451 X |
| 2,670,055 | 2/1954 | Dorman et al. _____ 55—276 |
| 2,687,782 | 8/1954 | Sonderegger _____ 55—454 X |
| 2,701,024 | 2/1955 | Thomas. |
| 2,808,893 | 10/1957 | Dornam et al. |
| 2,833,365 | 5/1958 | Kesl et al. _____ 280—5 X |
| 2,868,310 | 1/1959 | Lee _____ 180—69 X |
| 2,890,081 | 6/1959 | Terrett. |
| 3,048,959 | 8/1962 | Lowther _____ 55—459 X |

FOREIGN PATENTS 860,698   2/1961   Great Britain.

FRANK W. LUTTER, *Primary Examiner.*

HARRY B. THORNTON, *Examiner.*

D. TALBERT, *Assistant Examiner.*